UNITED STATES PATENT OFFICE.

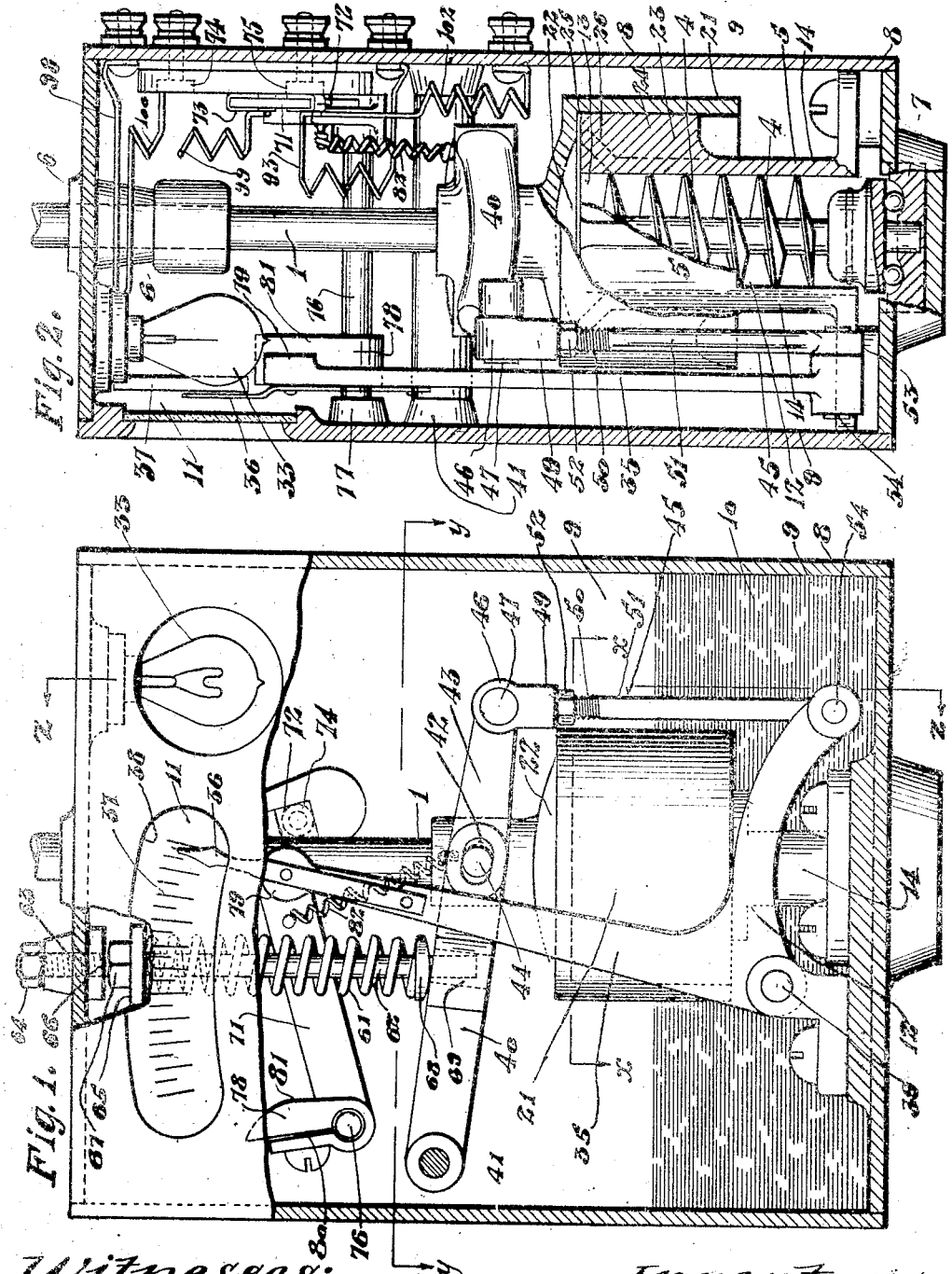

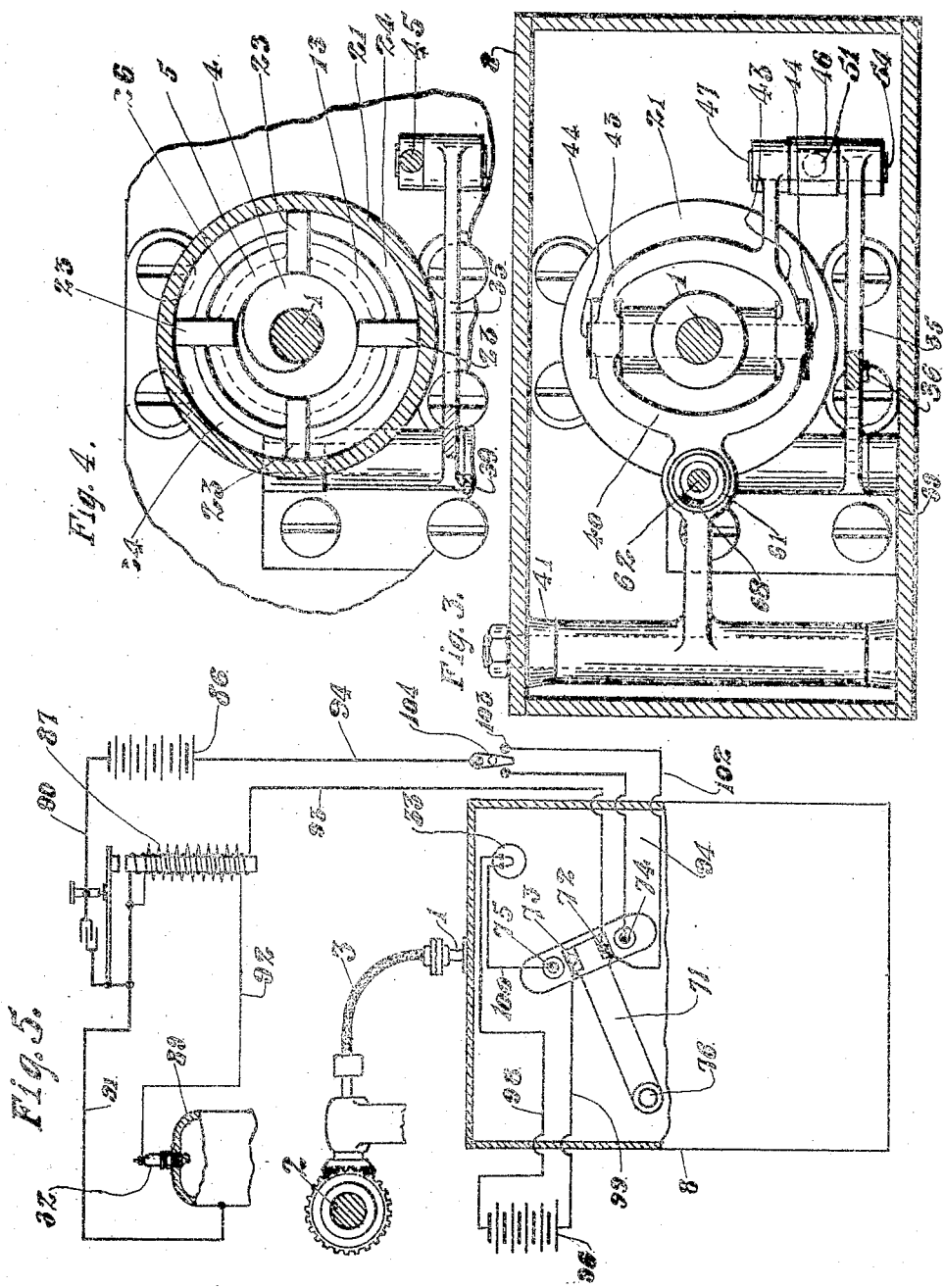

ARTHUR E. REUSS, OF CINCINNATI, AND OSCAR SCHNITZLER, OF REMINGTON, OHIO.

SPEED INDICATING OR CONTROLLING MECHANISM.

1,058,262.   Specification of Letters Patent.   Patented Apr. 8, 1913.

Application filed May 29, 1911. Serial No. 630,094.

*To all whom it may concern:*

Be it known that we, ARTHUR E. REUSS and OSCAR SCHNITZLER, citizens of the United States, residing, respectively, in Cincinnati and at Remington, in the county of Hamilton and State of Ohio, have jointly invented certain new and useful Improvements in Speed Indicating or Controlling Mechanism, of which the following is a specification.

Our invention relates to speed indicating or controlling mechanism applicable, for instance, for indicating or controlling the speed of a traveling vehicle, such as an automobile, and is arranged to be operated by a suitable power element, which may be instanced as the driving axle of the vehicle.

Our invention has for its object the provision of means whereby the travel of the vehicle may be controlled by its speed; further, the provision of novel means whereby the speed of the vehicle or other device to which our improvement is applied may be indicated; further, the provision of novel means embracing a conveyer mechanism adapted to actuate a resistance member, through which parts are actuated to indicate speed or to control parts; further, to effect indication or controlling of the speed by means of a viscous fluid, the movement whereof actuates a member or members for effecting indication or controlling of speed.

The invention will be further readily understood from the following description and claims, and from the drawings, in which latter:

Figure 1 is a front elevation of our improved device, with the front of the housing partly broken away. Fig. 2 is a vertical cross-section of the same on the line z—z of Fig. 1. Fig. 3 is a horizontal cross-section of the same on the line y—y of Fig. 1. Fig. 4 is a detail in cross-section on the line x—x of Fig. 1; and, Fig. 5 is a diagrammatic representation of a preferred form of electrically controlled connections of our invention.

1 represents a drive-shaft which may be driven from any suitable source, as from the axle 2 of an automobile, by means of a flexible shaft 3, or otherwise, as may be preferred.

4 is a screw, shown as a conveyer-screw on the drive-shaft, which operates in a tubular casing 5 received about the same. The drive-shaft is shown journaled in a bearing 6 and a step-bearing 7 in a housing 8, which may also form a reservoir 9, in which a body 10 of fluid is received, this fluid being preferably a viscous fluid, such as glycerin or a heavy oil, although other characters of fluid may be employed without departing from the spirit of our invention. The housing is shown as a suitable box, which may be attached to a suitable part, as to the dashboard of an automobile, preferably in view of the operator for exposing an indicator 11 to the vision of the operator.

The casing 5 has an inlet port 12 communicating with the reservoir, and a discharge port 13, also preferably communicating with the reservoir. The casing is shown as comprising uprights 14, secured to the bottom of the reservoir.

The fluid conveyer is adapted to discharge against an end-member which is movable, the movement thereof being controlled by the speed of said discharge. We have shown this end-member as comprising a cup 21, represented as an inverted cup, having an end 22, against which the fluid-discharge takes place. The wall of the cup is received about the tubular casing 5, preferably guided in axial movement by guides 23 on the casing.

Passages 24 are located between the outer wall of the tubular casing and the wall of the cup, and preferably the end of the casing is normally spaced from the end-member, as by a space 25 for normally permitting slight passage of fluid through the casing without actuation of said end-member. As the speed of the screw is increased, the force or pressure of the fluid against the end-member will also increase and thereby cause movement of the end-member, whereby the said space 25 between the end of the wall of the casing and the end-member is increased for permitting increasing flow of the fluid between said casing and end-member. The amount of movement of the end-member is controlled by the speed or pressure of the fluid discharge from the fluid conveyer. The end of the casing adjacent to the end-member is preferably of outward flaring form, as shown by the flaring lip 26, forming a bell-shape mouth for the end of the casing.

The end-member forms a floating member controlled by the fluid, which in turn controls the mechanism operated on by the apparatus. The end-member or floating member acts on an actuated member, which preferably affects an electrically controlled circuit or circuits. We have shown the same as affecting two electrically controlled devices, instancing the same as a spark-plug 32 and an incandescent lamp 33, these devices being shown as exemplifications and not as limitations. Thus 35 represents an actuated member, shown as a bell-crank arm, which has on it a pointer 36 of the indicator 11, the scale of which is shown at 37, the scale and pointer being exposed through the glass covering in an exposure-opening 38 of the housing. The bell-crank arm is pivoted at 39 to the housing.

40 is an arm pivoted at 41 to the housing. It preferably has loose articulations with the cup, shown as slots 42 in the arm, and pins 44 on the cup, the slots being shown in the spread walls 43 of the arm received about the hub of the cup.

45 is a link articulated with the arm 40 and the actuated member 35. This link is shown adjustable, as by having a bearing-piece 46 journaled about a pin 47 for forming the articulation with the arm 40; this bearing-piece having a threaded socket 49, in which the threaded end 50 of a rod 51 is received and held in place by a lock-nut 52, the rod having a bearing 53 about a pin 54 forming the articulation between the link and the bell-crank arm 35.

If desired, a resistance member may be provided upon which the end-member acts and which is primarily for the purpose of insuring against vibration of parts due, for instance, to the jolting of the vehicle or actuation of the engine. We have shown this resistance member as comprising a spring 61 received about a positioning rod 62 adjustably screwed into a threaded bearing 63 of the housing and held in place by a lock-nut 64.

65 is an adjustable collar, adjustable about the threaded end 66 of the rod, and held in place by a lock-nut 67.

68 is a collar slidable on the rod and bearing against the arm 40, the spring being between the collars. The adjustable connection of the rod with the housing adjustably positions the _ation of the spring with relation to the arm 40, and the adjustable collar 65 adjusts the spring tension. The inner end of the rod is loosely received in a recess 69 in the arm 40.

71 is a controlled member which is adapted to carry a portion of the electro-conductive parts of the electric circuit or circuits. We have shown the same as an arm having on it electric terminals 72, 73, one or both of which may be employed. These terminals are arranged to act in conjunction with electric terminals 74, 75, stationarily positioned on the housing. The arm 71 is preferably secured to a rock-shaft 76, journaled in bearings 77 in the housing. The rock-shaft has on it a part 78 arranged to be actuated by the arm 35, this part being shown as a contact-part, arranged to be contacted by the striker-part 79 on the arm 35, the same being actuated preferably when the arm 35 has been moved to one of its limits of movement, or at the point of actuation for which adjustment has been made. The contact-part 78 is shown as having a clamp-bearing 80, adjustably secured to the rock-shaft for determining its moment of actuation, and it has a contact-face 81 arranged to be struck by the striker-part 79 in the various positions to which the contact-part may be adjusted.

When the cup or end-member has been raised to its limit of movement desired, the contact-part 78 will be engaged by the striker-part 79 on the actuated member 35 for swinging the arm 71, and causing suitable control of the electric circuit or circuits. In the form shown the terminal 72 on the arm is normally in contact with the terminal 74 on the housing, the arm 71 being normally retracted by a spring 82. The arm is movable for having the terminal 73 thereon make contact with the terminal 75 on the housing when the arm 71 is at its other limit of movement, the respective pairs of terminals controlling two electric circuits which are controlled alternately.

In the present exemplifications the terminals 72, 74 control the electric circuit by which the spark in the spark-plug or plugs of the internal combustion motor of the vehicle are formed, the other circuit controlling a suitable signal shown as an incandescent lamp 33. These electrically controlled devices may be any suitable means.

The spark-plug circuit is shown as comprising a battery 86 of suitable form, a spark or induction coil 87, and a spark-plug 32, in the cylinder-head 89 of the internal combustion motor. An electric conductor 90 connects the battery with the spark-coil, electric conductors 91 92 connect the spark-coil with the spark-plug, an electric conductor 93 connects the spark-coil with the terminal 72 and an electric conductor 94 connects the battery with the terminal 74.

The circuit for the signal device is shown as including a battery 96, incandescent lamp 33, an electric conductor 98 connecting the battery with the lamp, an electric conductor 99 connecting the battery with the terminal 73, and an electric conductor 100 connecting the battery with the terminal 75.

With the arrangement stated and with the apparatus adjusted, for instance, for a 25 mile limit of speed travel, when the driving axle has reached said speed, the end pressure of the fluid passing through the fluid conveyer against the end-member will cause engagement of the striker-part 79 with the contact-part 78, whereby the arm 71 is swung for causing breaking of contact between the terminals 72, 74, and engagement of the terminals 73, 75, whereby the circuit supplying the spark-plug will be interrupted and the circuit supplying the signal lamp will be closed, thereby notifying the operator that the limit of speed has been reached and causing cessation of propulsion of the vehicle.

We have also shown provision whereby one of the circuits may be rendered inactive while the other is maintained active, as it may be desired, for instance, to notify the operator that the limit of speed has been reached without breaking the circuit or devices instrumental in operation of the vehicle. For this purpose we have provided a by-pass partial circuit shown as an electric conductor 102, having connection with the terminal 72 and a terminal 103 of a switch 104 which is located in the electric conductor 94. By means of this switch the electric conductor 94 may be interrupted and the circuit closed with the partial circuit by means of conductor 102, whereby the spark-plug circuit is rendered independent of control by the making or breaking of the terminals 72, 74. It is understood that a suitable timing device for the spark-plug circuit is provided whereby the sparking is effected in proper relation to piston travel. This is however not shown because well known.

Having thus fully described our invention, what we claim as new and desire to secure by Letters Patent is:

1. In mechanism of the character described, the combination of a fluid-conveyer embracing a conveyer-screw and a tubular casing received thereabout, and a cup the wall whereof surrounds said conveyer-screw and tubular casing and said cup having an end against which the conveyed fluid is discharged by said fluid-conveyer for moving said cup for distances controlled by the fluid conveyed thereby.

2. In mechanism of the character described, the combination of a fluid-conveyer embracing a conveyer-screw and a tubular casing received thereabout, a cup the wall whereof surrounds said conveyer-screw and tubular casing and said cup having an end against which the conveyed fluid is discharged by said fluid-conveyer for moving said cup for distances controlled by the fluid conveyed thereby, and auxiliary resistance means for said cup.

3. In mechanism of the character described, the combination of a fluid-conveyer embracing a conveyer-screw and a tubular casing received thereabout, the said tubular casing having an upper outwardly flaring mouth, a cup the wall whereof surrounds said conveyer-screw and said tubular casing and the mouth of the latter, and said cup having an end against which the conveyed fluid is discharged by said fluid-conveyer for moving said cup for distances controlled by the fluid conveyed thereby.

4. In mechanism of the character described, the combination of a fluid-conveyer embracing a conveyer-screw and a tubular casing received thereabout, and a cup the wall whereof is received about said conveyer-screw and tubular casing and said cup having an end against which the fluid conveyed by said fluid-conveyer is discharged for controlling the positions of said cup, and the said wall and the tubular portion of said casing having guiding ribs therebetween, between which guiding ribs discharge-passages for the fluid are formed.

5. In mechanism of the character described, the combination of a fluid-conveyer, a floating member against which said fluid-conveyer discharges and which is movable and the extent of movement whereof is dependent upon the pressure thereagainst by the fluid conveyed by said fluid-conveyer, an indicating scale, a bell-crank lever one of the arms whereof is provided with a pointer which coacts with said indicating scale, and adjustable connecting means connecting the other arm of said bell-crank lever with said floating member.

6. In mechanism of the character described, the combination of a fluid-conveyer embracing a conveyer-screw, a tubular casing received thereabout, a cup the wall whereof is received about said conveyer-screw and tubular casing, said cup having an end against which the fluid conveyed by said fluid-conveyer is discharged for moving the same and the extent of movement whereof is dependent upon the pressure thereagainst by said fluid, and an indicating scale and an indicating pointer coacting therewith forming a pair of indicating parts, one of which has connection with said cup, substantially for the purpose described.

7. In mechanism of the character described, the combination of a fluid-conveyer embracing a conveyer-screw and a tubular casing received thereabout, a cup the wall whereof is received about said conveyer-screw and tubular casing, the said cup having an end against which said conveyer-screw discharges, and the said wall and tubular casing having a fluid discharge-passage therebetween.

3. In speed indicating or controlling mechanism, the combination of a screw-conveyer, a cup having an end against which said conveyer discharges and which is controlled by the speed of said discharge, articulating means between said arm and said cup, a spring acting on said arm, and means for adjustably tensioning and positioning said spring, substantially as described.

In testimony whereof, we have signed our names hereto in the presence of two subscribing witnesses.

ARTHUR E. REUSS.
OSCAR SCHNITZLER.

Witnesses:
EDWARD SOUTHWORTH,
ANNA M. RYAN.